(12) United States Patent
Tsunehara et al.

(10) Patent No.: US 7,272,418 B2
(45) Date of Patent: Sep. 18, 2007

(54) BASE STATION AND WIRELESS COMMUNICATION SYSTEM

(75) Inventors: Katsuhiko Tsunehara, Hachioji (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 727 days.

(21) Appl. No.: 10/848,367

(22) Filed: May 19, 2004

(65) Prior Publication Data

US 2005/0014525 A1    Jan. 20, 2005

(30) Foreign Application Priority Data

Jul. 17, 2003    (JP) .............................. 2003-275927

(51) Int. Cl.
*H04M 1/00*    (2006.01)
(52) U.S. Cl. ............... 455/562.1; 455/456.1; 455/421; 455/561; 455/404.2; 455/446; 342/465; 342/451
(58) Field of Classification Search ............. 455/456.1, 455/462, 421, 561, 562.1, 88, 100, 404.2, 455/446, 41.2, 41.3, 435.2; 342/465, 451
See application file for complete search history.

(56) References Cited

U.S. PATENT DOCUMENTS

| | | | | |
|---|---|---|---|---|
| 6,154,665 | A * | 11/2000 | Briffett et al. | 455/574 |
| 7,215,926 | B2 * | 5/2007 | Corbett et al. | 455/41.2 |
| 2003/0134648 | A1 * | 7/2003 | Reed et al. | 455/456 |
| 2006/0125695 | A1 * | 6/2006 | Kennedy et al. | 342/465 |
| 2007/0150192 | A1 * | 6/2007 | Wakamatsu et al. | 701/213 |

FOREIGN PATENT DOCUMENTS

| | | | |
|---|---|---|---|
| EP | 630118 A1 * | 6/1994 | |
| JP | 7-181242 | 12/1993 | |

OTHER PUBLICATIONS

Ogino et al., "Integrated Wireless LAN Access System (1) Study on Location System", 2003 IEICE General Meeting, Hitachi Ltd. Central Research Laboratory, p. 662, with English translation.

* cited by examiner

*Primary Examiner*—Matthew Anderson
*Assistant Examiner*—Sujatha Sharma
(74) *Attorney, Agent, or Firm*—Reed Smith LLP; Stanley P. Fisher, Esq.; Juan Carlos A. Marquez, Esq.

(57) ABSTRACT

The present invention reduces the number of base stations required to carry out terminal position detection. A base station which serves for terminal position detection using radio signals comprises an antenna to transmit and receive a radio signal; a radio signal receiver which generates a received signal from the radio signal received; a signal processing unit which processes the received signal and generates a transmit signal; a radio signal transmitter which generates a radio signal from the transmit signal; a control unit which exerts control of the base station operation; and a signal processing unit for position detection which performs signal processing for terminal position detection. A signal receivable range with which a signal can be received by the radio signal receiver is made longer than a signal transmission range with which a signal is transmitted by the radio signal transmitter.

12 Claims, 12 Drawing Sheets

BASE STATION AND WIRELESS COMMUNICATION SYSTEM

CLAIM OF PRIORITY

The present application claims priority from Japanese application JP 2003-275927 filed on Jul. 17, 2003, the content of which is hereby incorporated by reference into this application.

FIELD OF THE INVENTION

The present invention relates to a wireless communication system and its base stations which serve for detecting the position of a mobile terminal, using radio signals.

BACKGROUND OF THE INVENTION

In a cellular system, a method for detecting the position of a mobile terminal has been proposed (for example, refer to Japanese Patent Document Cited 1). This method comprises calculating time differences of arrival of signals transmitted from base stations to the mobile terminal (that is, time differences of propagation of the signals from the base stations to the mobile terminal $T_1$-$T_2$ and $T_3$-$T_2$), multiplying the propagating time differences by velocity of light, thus calculating differences between the propagation distances of the signals from the base stations to the mobile terminal:

$$D_1 - D_2 = c(T_1 - T_2); \text{ and}$$

$$D_3 - D_2 = c(T_3 - T_2).$$

In a wireless LAN system as well, a method for detecting the position of a terminal has been proposed (for example, refer to Non-Patent Document Cited 1). This method comprises calculating time differences of arrival of a signal transmitted from the terminal and received at base stations (that is, differences between times when the base stations received the signal, Ti–T1), multiplying the time differences of arrival by velocity of light, thus calculating differences between the signal propagation distances from the terminal to the base stations:

$$\{|P-Pi|-|P-P1|\} = c(Ti-T1), i=2, \ldots, n.$$

FIG. 9 is a diagram showing the topology of base stations in such a conventional wireless communication system.

Base stations 1 to 3 can perform uplink communication (a terminal transmits a signal and a base station receives the signal) and downlink communication (a base station transmits a signal and a terminal receives the signal) with terminals present in their areas 11 to 13. In general, in a wireless communication system, base stations are deployed so that as small numbers of base stations as possible can serve for communication with a terminal 20 in a location. That is, the base stations are deployed so that the overlap portions of the areas 11 to 13 are minimized.

FIG. 10 is a block diagram showing the configuration of a base station for use in the wireless communication system shown in FIG. 9. The base station is representative of base stations in an instance where a terminal position is detected, based on the time differences of arrival of a signal transmitted from the terminal and received at the base stations, as described in Non-Patent Document Cited 1.

A signal received by an antenna 100 is input through a circulator 101 to a radio signal receiver 102. The radio signal receiver 102 converts the signal to a baseband signal and a baseband signal processing unit 103 performs demodulation, decoding, and error correction of the baseband signal. Then, a signal processing unit for position detection 106 performs signal processing required for position detection, such as received signal capturing, a delay profile calculation, and path detection.

FIG. 11 is a flowchart of a communication data rate setup process that is applied in the wireless communication system shown in FIG. 9.

In general, in the wireless communication system, uplink and downlink communication data rates are set when communication is initiated and during the communication. By a communication data rate required for quality of signal, traffic, and contents of communication (for example, voice, still picture, moving picture, data, etc.) on a radio channel between a terminal and a base station, the communication data rate of the radio channel is determined (step 310). Specifically, for example, if the quality of signal is bad, traffic is large, or the required communication data rate is low, then the communication data rate is set low. Conversely, if the quality of signal is good, traffic is small, or the required communication data rate is high, then the communication data rate is set high.

This communication data rate setup process is performed at the base station and the terminal. For uplink communication and downlink communication, different communication data rates may be set up or a same communication data rate may be set up.

[Japanese Patent Document Cited 1] JP-A No. 181242/1995

[Non-Patent Document Cited 1] Ogino Atsushi, et al. (five co-writers) "Integrated Wireless LAN Access System (1) Exploring a Position Detection System" in collected lecture papers B-5-203, p. 662, for the 2003 general conference of the Institute of Electronics, Information and Communication Engineers The above-discussed conventional wireless communication system is designed such that the uplink cover area of a base station (area where the base station can receive a signal from a terminal) and the downlink cover area (area where a signal transmitted from the base station arrives at a terminal) of the base station are identical. For example, if the terminal 20 is present in the location as shown in FIG. 9, the terminal 20 is present within the uplink cover area of the base station 1, but not present within the uplink cover areas of the base stations 2, 3. Therefore, the base station 2 and base station 3 cannot receive an uplink signal transmitted by the terminal 20 (or the base stations 2 and 3 can receive, but receive only a poor quality signal from the terminal). Consequently, only the base station 1 can receive the uplink signal transmitted by the terminal 20.

To implement the above-mentioned method for detecting the position of a terminal, based on the time differences of arrival of a signal transmitted from the terminal and received at base stations (refer to Non-Patent Document Cited 1), at least three base stations have to receive an uplink signal transmitted by the terminal. To detect the position of the terminal 20 by the position detection method using such an uplink signal, thus, additional base stations 4 and 5 having uplink cover areas where the terminal 20 is present need to be installed, for example, as is shown in FIG. 12.

Requirement for communication purpose only is simply that any possible position of the terminal falls within the uplink/downlink cover areas of one base station. However, requirement for position detection of a terminal is that any possible position of the terminal must fall within the uplink cover areas of three base stations. Therefore, the number of base stations throughout the system required to realize terminal position detection increases three times as many as the number of base stations required for only communication between a base station and a terminal.

Accordingly, for a wireless communication system which provides for terminal position detection, cost needed for its equipment rises, which in turn poses a problem of rise in the cost of a location information service (service fee) that informs a terminal user of its detected position.

SUMMARY OF THE INVENTION

To solve the above problem, a base station of the present invention includes a means for making its signal receivable range longer than its signal transmission range and, consequently, making its uplink cover area wider than its downlink cover area. Specifically, the base station of the invention includes an antenna whose receiving gain is higher than its transmitting gain. Alternatively, the base station of the invention includes a high-gain antenna common for transmitting and receiving use and a means for controlling transmitting power (for example, an attenuator and a gain controller). Alternatively a terminal and/or a base station include a means for reducing the transmission rate of an uplink signal that is used for terminal position detection to a low rate.

In the present invention, a base station's signal receivable range is made longer than its signal transmission range and, consequently, its uplink cover area is made wider than its downlink cover area. Thus, detecting the position of a terminal can be performed without increasing the number of base stations, compared with the number of base stations required for communication. Accordingly, with reduction in the cost required for the equipment of the wireless communication system, the cost of the location information service can be decreased.

DETAILED DESCRIPTION OF THE INVENTION

Preferred embodiments of the present invention will be described hereinafter with reference to the accompanying drawings.

Figure 1:
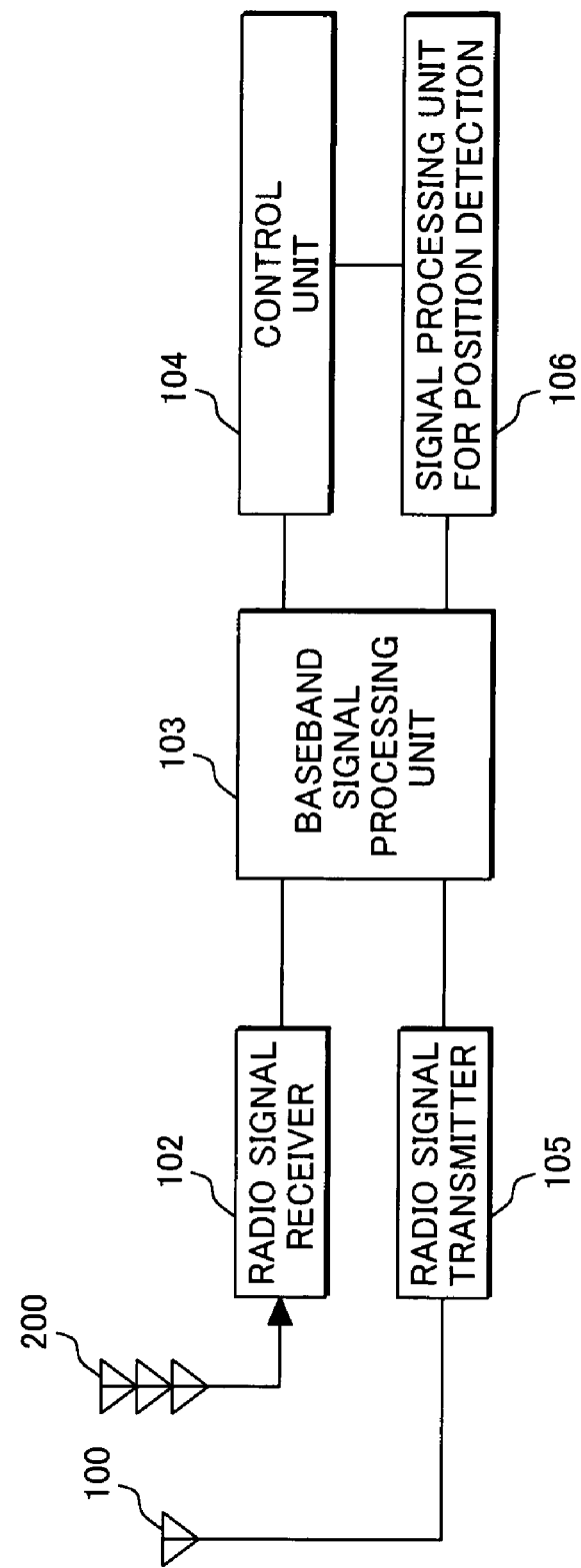
FIG. 1 is a block diagram showing the configuration of a base station according to a preferred Embodiment 1 of the present invention.

FIG. 1 is a block diagram showing the configuration of a base station according to a preferred Embodiment 1 of the present invention.

An antenna 100 is connected to a radio signal transmitter 105 and transmits a radio signal. An antenna 200 having higher gain than the antenna 100 that is used for transmission is connected to a radio signal receiver 102 and receives a radio signal. That is, the high-gain antenna 200 that is used for reception has higher gain than the antenna 100 that is used for transmission and, as this antenna, for example, a multistage collinear antenna or an adaptive array antenna can be used. The antenna 100 and the high-gain antenna 200 may be integrated into an assembly or may be separate ones.

If the adaptive array antenna is used, the antenna gain is controlled to change so as to make the transmitting gain low and the receiving gain high. In this way, the adaptive array antenna can realize both the functions of the antenna 100 and the high-gain antenna 200.

The radio signal receiver 102 performs high frequency and medium frequency amplification and detection and processing, and converts the radio signal to a baseband signal. A baseband signal processing unit 103 performs demodulation, decoding, and error correction of the baseband signal generated by the radio signal receiver 102.

Also, the baseband signal processing unit 103 performs coding and modulation and generates a baseband transmit signal. The radio signal transmitter 105 performs intermediate frequency and high frequency amplification and other necessary processing for the baseband transmit signal generated by the baseband signal processing unit 103 and thus generates a transmit signal. The transmit signal generated by the radio signal transmitter 105 passes through a circulator 101 and is transmitted from the antenna 100.

Figure 11:
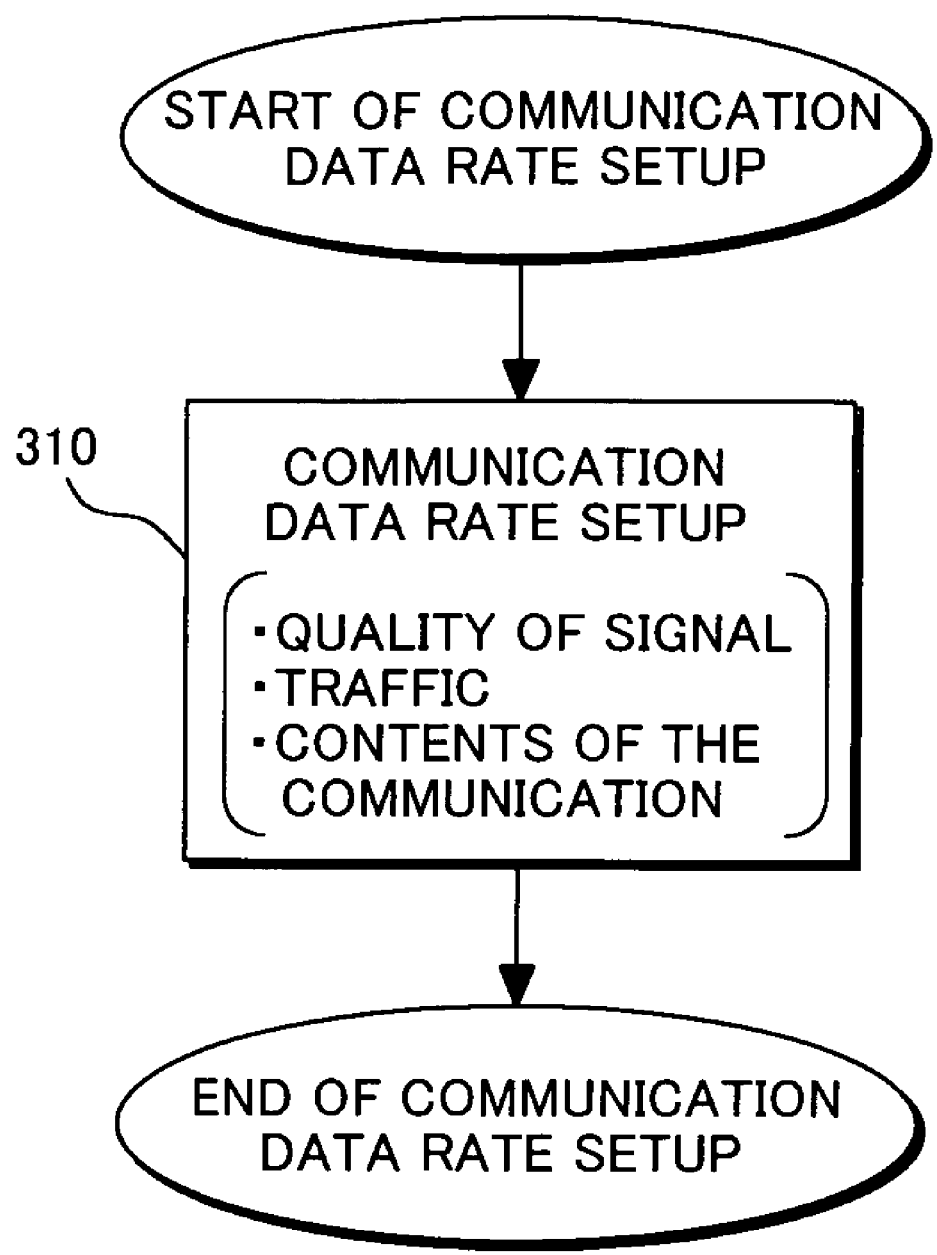
FIG. 11 is a flowchart of a communication data rate setup process in the conventional wireless communication system.
Figure 12:
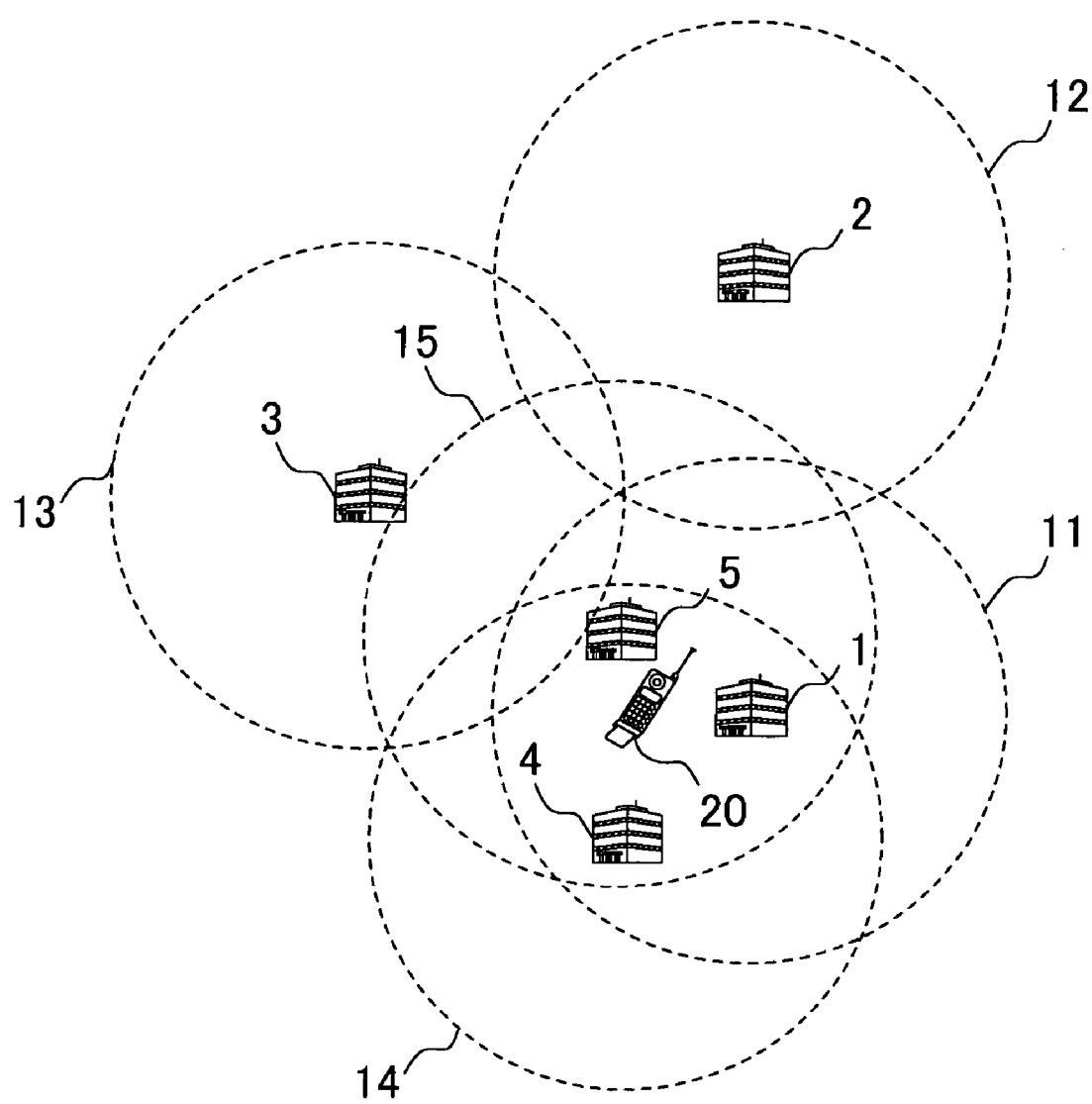
FIG. 12 is an explanatory drawing of the topology of base stations to implement terminal position detection in the conventional wireless communication system.

A control unit 104 exerts control over all the components of the base station and exerts control of base station operations for protocol-based wireless communication with a terminal and protocol-based communication with an external network. The above-discussed communication data rate setup process (FIG. 11) is executed by the control unit 104.

A signal processing unit for position detection 106 performs signal processing required for position detection, such as received signal capturing, a delay profile calculation, and path detection, for the decoded signal output from the baseband signal processing unit 103.

Figure 2:
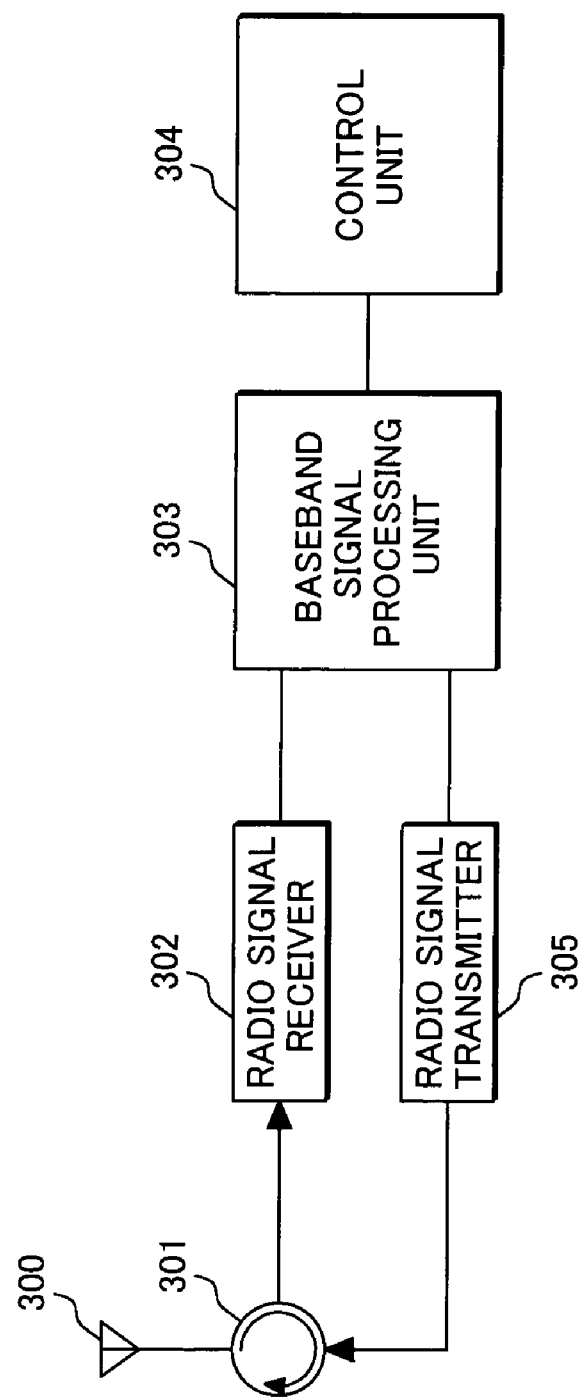
FIG. 2 is a block diagram showing the configuration of a terminal according to Embodiment 1 of the present invention.

FIG. 2 is a block diagram showing the configuration of a terminal according to Embodiment 1 of the present invention.

An antenna 300 is connected via a circulator 301 to a radio signal receiver 302 and a radio signal transmitter 305 and the circulator 301 separates transmit signals and received signals.

The radio signal receiver 302 performs high frequency and medium frequency amplification and detection and processing, and converts a radio signal to a baseband signal. A baseband signal processing unit 303 performs demodulation, decoding, and error correction of the baseband signal generated by the radio signal receiver 302.

Also, the baseband signal processing unit 303 performs coding and modulation and generates a baseband transmit signal. The radio signal transmitter 305 performs intermediate frequency and high frequency amplification and other necessary processing for the baseband transmit signal generated by the baseband signal processing unit 303 and thus generates a transmit signal. The transmit signal generated by the radio signal transmitter 305 passes through the circulator 301 and is transmitted from the antenna 300.

A control unit 304 exerts control over all the components of the terminal and exerts control of terminal operations for protocol-based wireless communication with a base station. The above-discussed communication data rate setup process (FIG. 11) is executed by the control unit 304.

Figure 3:
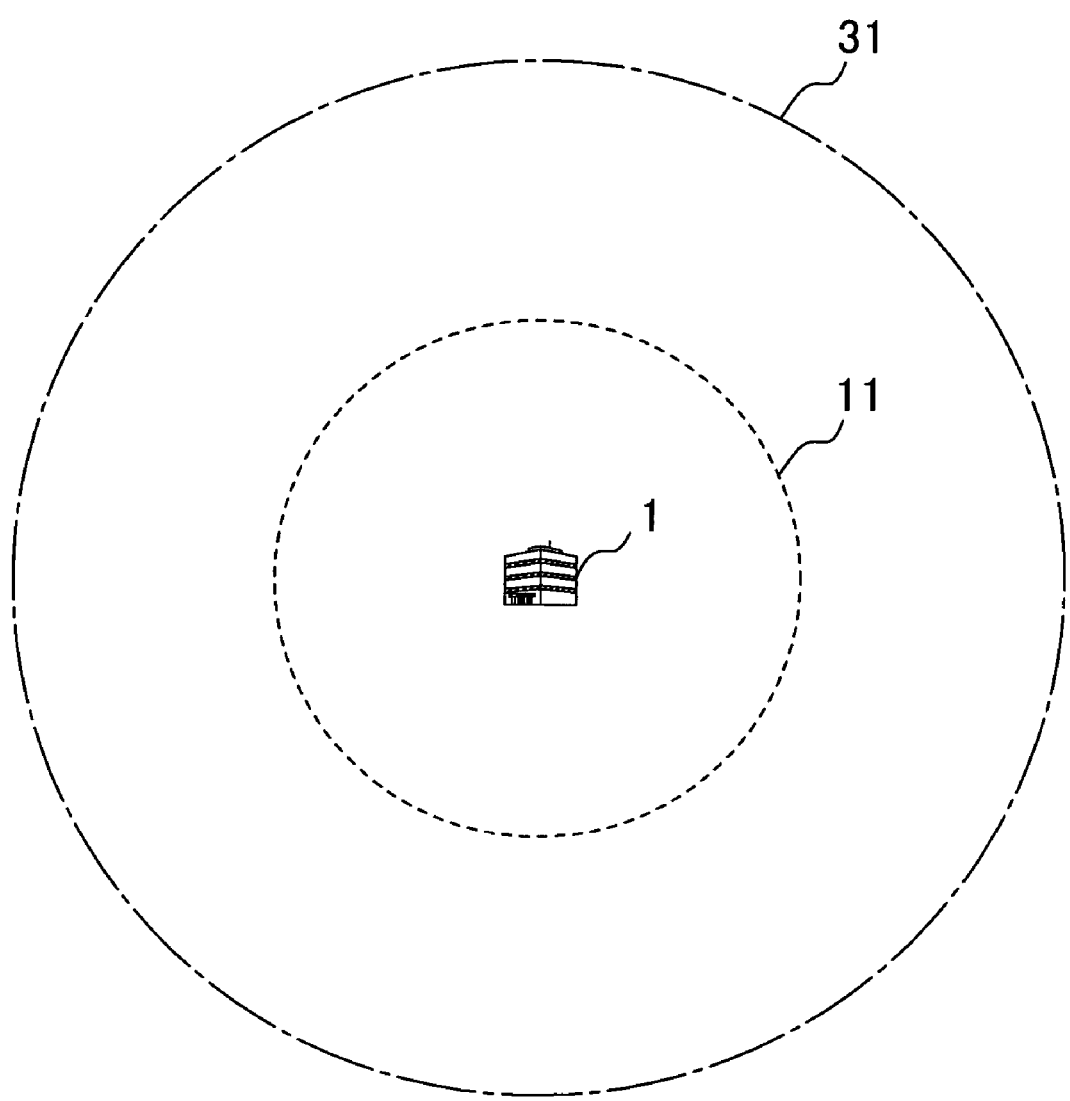
FIG. 3 is an explanatory drawing of the uplink and downlink cover areas of a base station according to Embodiment 1 of the present invention.

FIG. 3 shows the uplink and downlink cover areas of the base station shown in FIG. 1.

The uplink cover area 31 of the base station 1 is wider than its downlink cover area 11. This is because the base station 1 uses the higher-gain receiving antenna 200 and is thus capable of receiving an uplink signal transmitted from a terminal that is located farther. In other words, the base station 1 can cover a terminal that is located away out of the downlink cover area (area where a transmit signal from the base station arrives at a terminal) within the uplink cover area (area where the base station can receive a signal from a terminal).

Figure 4:
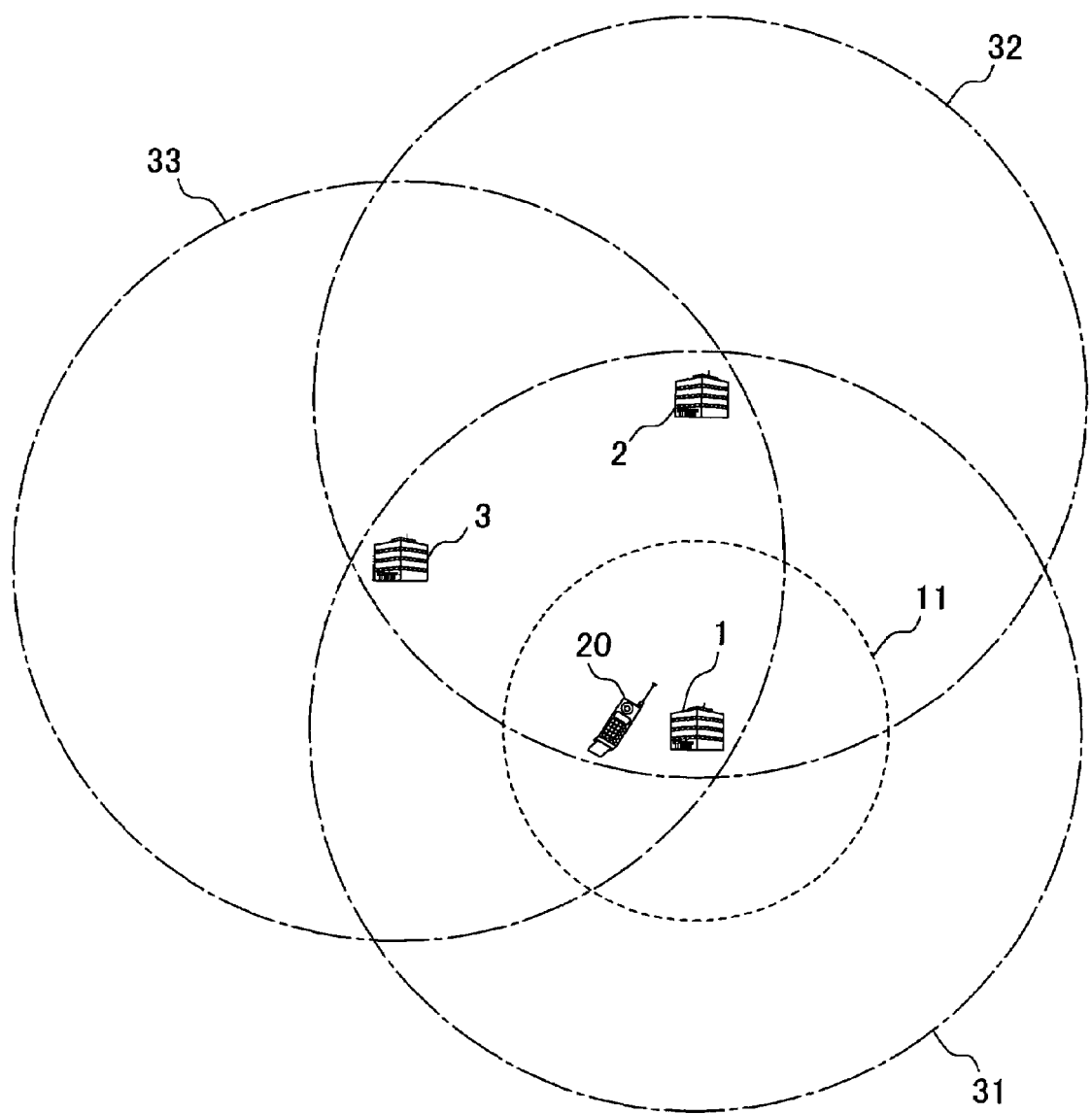
FIG. 4 is an explanatory drawing of the cover areas of base stations in the wireless communication system according to Embodiment 1 of the present invention.

FIG. 4 shows the cover areas of base stations in the wireless communication system according to Embodiment 1 of the present invention. In the example shown in FIG. 4, the base stations are deployed in positions corresponding to the positions of the base stations in the conventional similar system example shown in FIG. 9.

As noted above, the uplink cover areas of the base stations of Embodiment 1 of the present invention are wider than the downlink cover areas 11 thereof. Because the terminal 20 falls within the downlink cover area of the base station 1, the terminal 20 can receive a downlink signal transmitted by the base station 1. At the same time, because the terminal 20 falls within the uplink cover areas 31 to 33 of all base stations 1 to 3, all the base stations 1 to 3 can receive an uplink signal transmitted by the terminal 20.

Therefore, by using the method for detecting the position of a terminal, based on the time differences of arrival of a signal transmitted from the terminal and received at the base stations, detecting the position of the terminal 20 can be performed without increasing the number of base stations.

Next, a preferred Embodiment 2 of the present invention is discussed.

Figure 5:
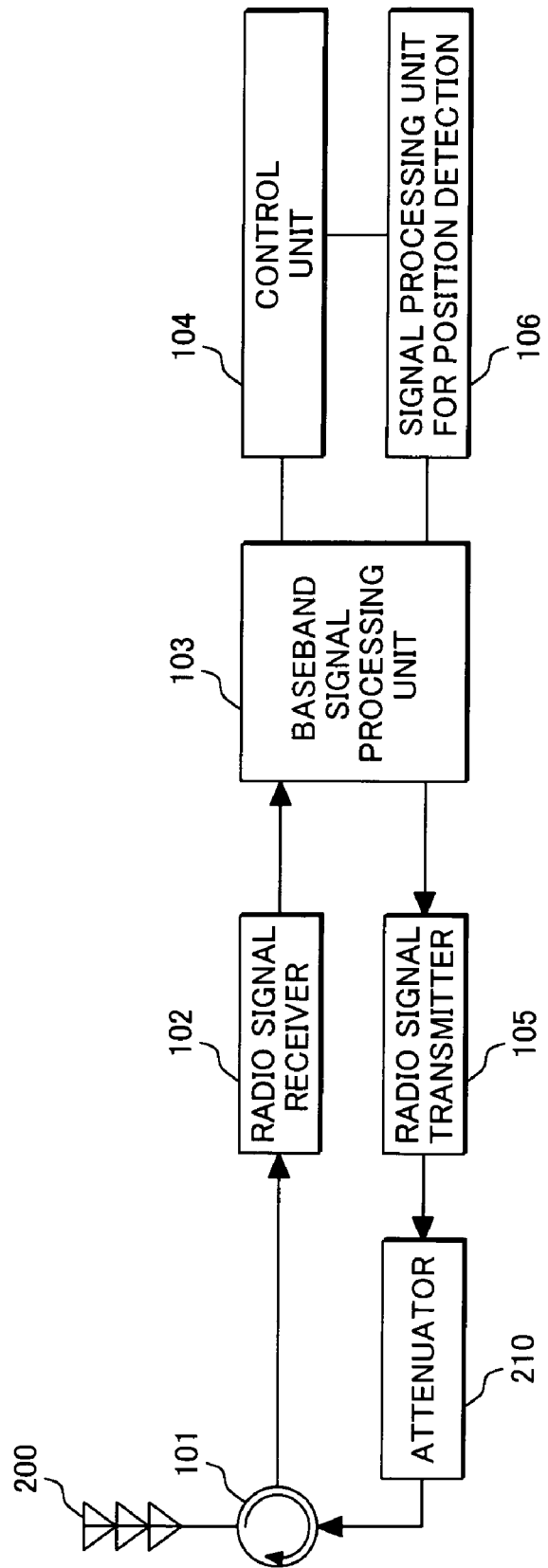
FIG. 5 is a block diagram showing the configuration of a base station according to a preferred Embodiment 2 of the present invention.

FIG. 5 is a block diagram showing the configuration of a base station according to Embodiment 2 of the present invention. Components corresponding to those of the base station (FIG. 1) of the above Embodiment 1 are assigned the same reference numbers and their detailed explanation is not repeated.

A high-gain antenna 200 is connected via a circulator 101 to a radio signal receiver 102 and a radio signal transmitter 105 and the circulator 101 separates transmit signals and received signals. As an isolator, a duplexer consisting of a combination of band-pass filters or a switch to change over between antenna connections in accordance with transmitting and receiving timing may be used, instead of the circulator.

An attenuator 210 attenuates a transmit signal output from the radio signal transmitter 105 to restrict the transmitting power from the high-gain antenna 200 to a predetermined value. For this predetermined value, a suitable value of the following may be used: transmitting power or electric field intensity prescribed by law such as the Radio Law or equivalent; and the electric power or electric field intensity of a signal that is transmitted from the antenna 100 of the base station (see FIG. 1) of Embodiment 1.

If the adaptive array antenna is used as the high-gain antenna 200, the antenna gain can be changed to make the transmitting gain different from the receiving gain. Without adding the attenuator 210, the transmitting power can be adjusted to the predetermined value, while the receive sensitivity can be increased.

As discussed above, as is the case for the base stations of the above Embodiment 1 (FIG. 1), the base stations of Embodiment 2 also have their uplink cover areas (area where the base station can receive a signal from a terminal) that are wider than their downlink cover areas (area where a transmit signal from the base station arrives at a terminal), so that each base station can receive a signal from a terminal located out of its downlink cover area (see FIG. 3). Thus, detecting the position of the terminal 20 can be performed without increasing the number of base stations (see FIG. 4), as is the case for the base stations of the above Embodiment 1 (FIG. 1).

Next, a preferred Embodiment 3 of the present invention is discussed.

Figure 6:
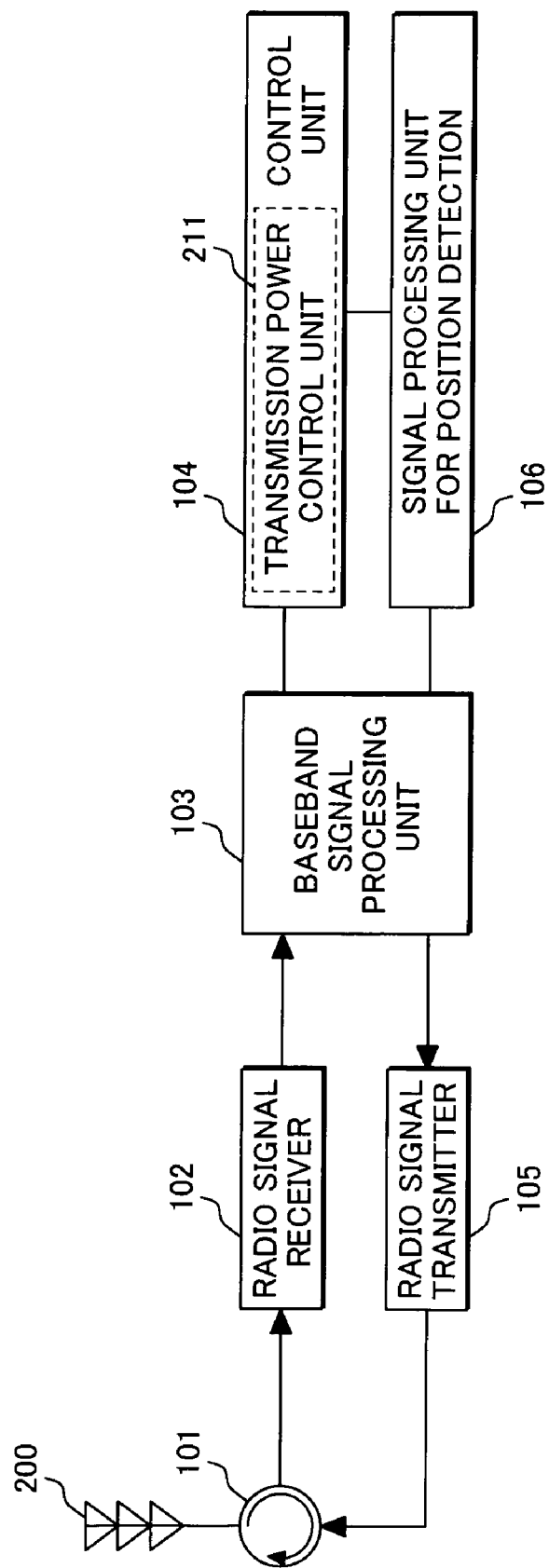
FIG. 6 is a block diagram showing the configuration of a base station according to a preferred Embodiment 3 of the present invention.

FIG. 6 is a block diagram showing the configuration of a base station according to Embodiment 3 of the present invention. Components corresponding to those of the base station (FIG. 1) of the above Embodiment 1 are assigned the same reference numbers and their detailed explanation is not repeated.

A high-gain antenna 200 is connected via a circulator 101 to a radio signal receiver 102 and a radio signal transmitter 105 and the circulator 101 separates transmit signals and received signals.

A transmission power control unit 211 which is incorporated in a control unit 104 sets the level of a signal output from a baseband signal processing unit 103 to reduce the transmitting power from the antenna 200 to a predetermined value. As is the case for the above Embodiment 2, for this predetermined transmitting power, a suitable value of the following may be used: transmitting power or electric field intensity prescribed by law; and the same electric power or electric field intensity of a signal that is transmitted by a base station of Embodiment 1.

As discussed above, as is the case for the base stations of the above Embodiment 1 (FIG. 1), the base stations of Embodiment 3 also have their uplink cover areas (area where the base station can receive a signal from a terminal) that are wider than their downlink cover areas (area where a transmit signal from the base station arrives at a terminal), so that each base station can receive a signal from a terminal located out of its downlink cover area (see FIG. 3). Thus, detecting the position of the terminal 20 can be performed without increasing the number of base stations (see FIG. 4), as is the case for the base stations of the above Embodiments 1 and 2 (FIGS. 1 and 5).

Figure 10:
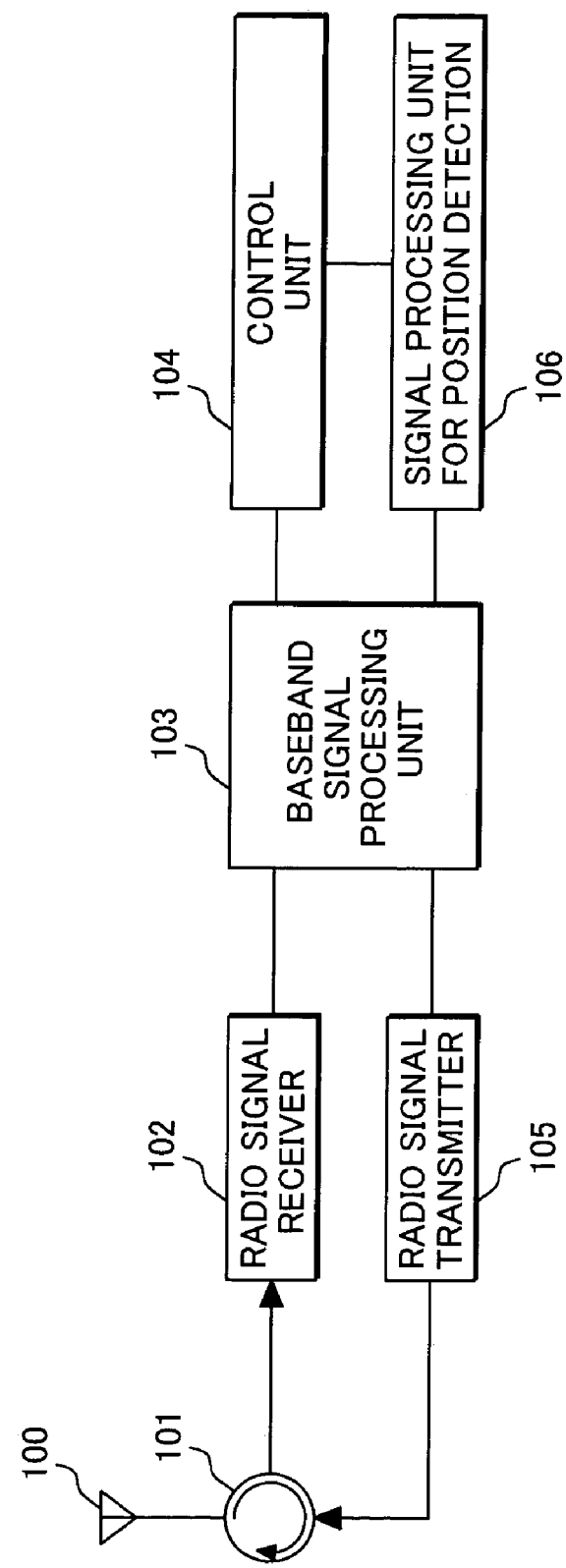
FIG. 10 is a block diagram showing the configuration of a base station in the conventional wireless communication system.

Next, a preferred Embodiment 4 of the present invention is discussed. In Embodiment 4, the configuration of a base station is the same as that of a conventional base station (FIG. 10), but difference lies in the communication data rate setup process that is executed by the control unit 104.

Figure 7:
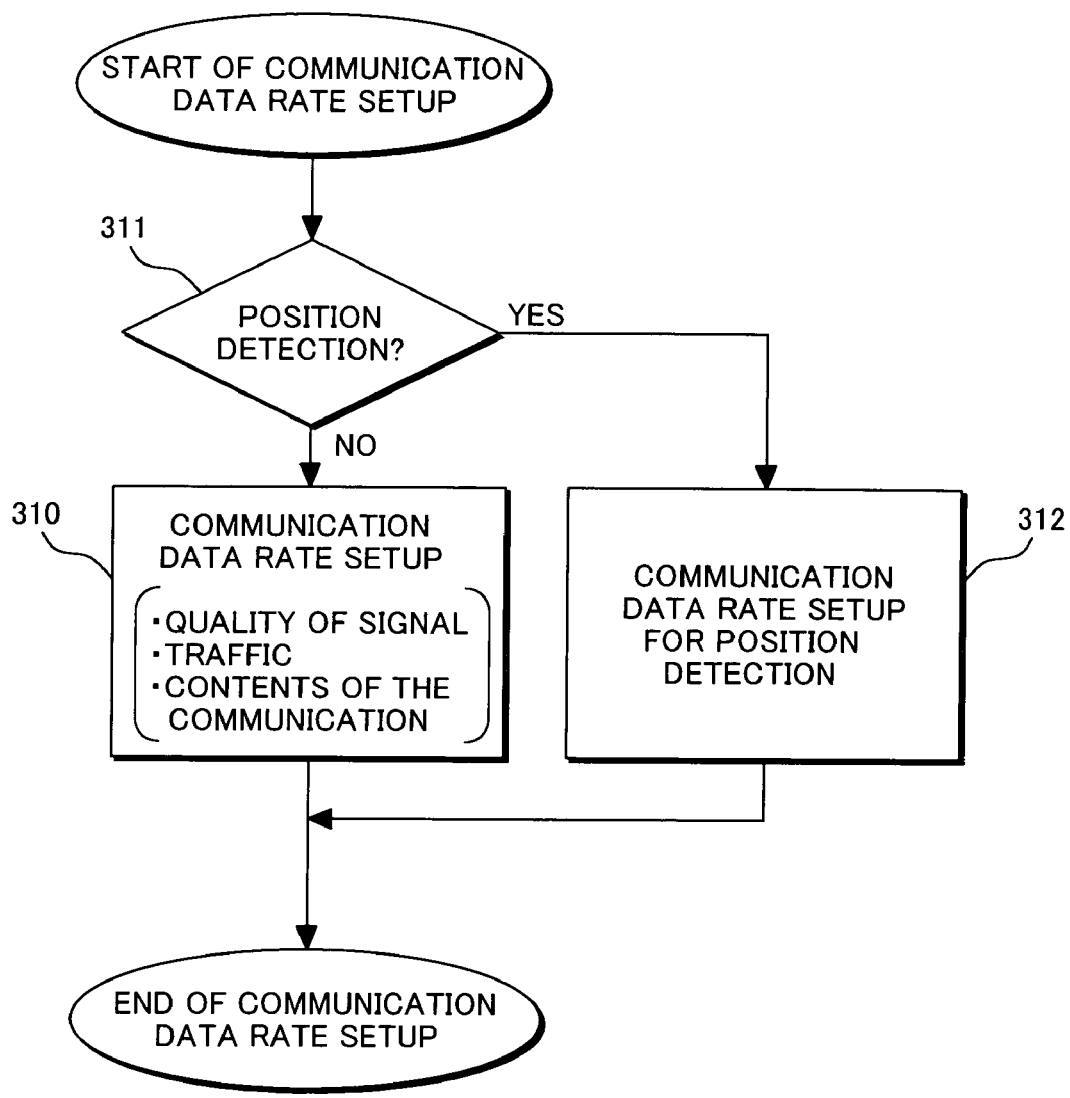
FIG. 7 is a flowchart of a communication data rate setup process according to a preferred Embodiment 4 of the present invention.

FIG. 7 is a flowchart of a communication data rate setup process according to Embodiment 4 of the present invention.

First, it is determined whether an uplink signal for which a communication data rate must be set is used for position detection (step 311). As the result of the decision at step 311, if the uplink signal is not used for position detection, by a communication data rate required for quality of signal, traffic, and contents of communication (for example, voice, still picture, moving picture, data, etc.) on the radio channel between the terminal that transmits the uplink signal and the base station that receives the uplink signal, the communication data rate of the radio channel is determined (step 310). Specifically, for example, if the quality of signal is bad, traffic is large, or the required communication data rate is low, then the communication data rate is set low. Conversely, if the quality of signal is good, traffic is small, or the required communication data rate is high, then the communication data rate is set high.

Otherwise, as the result of the decision at step 311, if the uplink signal is used for position detection, the uplink communication data rate is set at a communication data rate for position detection that is a lowest rate that can be applied in the wireless communication system (that is, the lowest communication data rate for the base station to support) (step 312). Specifically, the communication data rate is changed by altering the modulation algorithm, coding parameters (coding algorithm), and error correction algorithm.

According to the communication data rate determined through the above communication data rate setup flow, the control unit 104 of the base station sets up the base station's components and the control unit 304 of the terminal sets up the terminal's components.

The above determination as to whether the uplink signal is used for position detection may be made by the base station and the base station may tell the terminal to change the rate of the signal to be transmitted from the terminal or may be made by the terminal and the terminal may change the rate of the signal to be transmitted.

In general, if the uplink signal transmitting power remains constant, the lower the communication rate, the energy per information bit increases, and the base station becomes able to receive an uplink signal transmitted by a terminal that is farther located. Therefore, by performing the above communication data rate setup method of Embodiment 4, the uplink cover area (area where the base station can receive a signal from a terminal) of each base station becomes wider than its downlink cover area (area where a transmit signal from the base station arrives at a terminal), and each base station can receive a signal from a terminal located out of its downlink cover area (see FIG. 3). Thus, detecting the position of the terminal 20 can be performed without increasing the number of base stations (see FIG. 4), as is the case for the base stations of the above Embodiments 1, 2, and 3 (FIGS. 1, 5, and 6).

Next, the relationship between uplink and downlink cover areas and inter-base station distance is discussed, taking an example where the base stations of Embodiments 1 to 4 (FIGS. 1, 5, 6, and 7) of the present invention are used.

Figure 9:
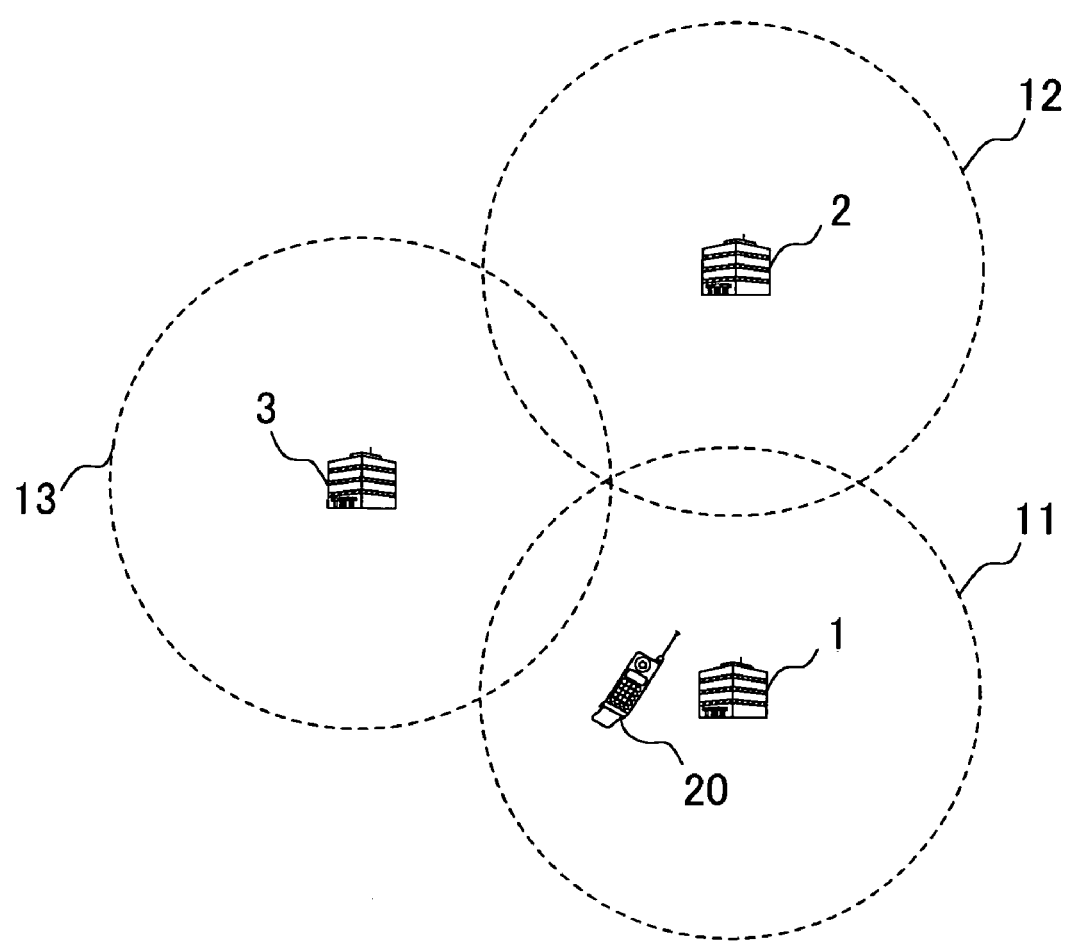
FIG. 9 is an explanatory drawing of a basic topology of base stations in a conventional wireless communication system.

As described in the section of background of the invention, in a wireless communication system, in order that as small numbers of base stations as possible serve for communication with a terminal 20 falling within an area, base stations are deployed so that the overlap portions of their cover areas are minimized, for example, as shown in FIG. 9.

Therefore, given that the cover areas are circular, the radius of the downlink signal cover area (area where a transmit signal from the base station arrives at a terminal) that is used for communication is about a half the inter-base station distance.

On the other hand, the radius of the uplink signal cover area (area where the base station can receive a signal from a terminal) that is used for terminal position detection must be as long as the inter-base station distance. This is because an uplink signal transmitted by the terminal 20 that is present in the vicinity of the base station 1 must be received by the base stations 2 and 3 as well (see FIG. 4).

Therefore, for the wireless communication system using the base stations of Embodiments 1 to 4 (FIGS. 1, 5, 6, and 7) the base stations are preferably deployed such that the uplink cover range of each base station is about double its downlink cover range.

Also, in the wireless communication system using the base stations of Embodiments 1 to 4 (FIGS. 1, 5, 6, and 7), the base stations may be deployed such that the uplink cover range of each base station is less than double its downlink cover range with the addition of a base station dedicated to terminal position detection.

The accuracy of terminal position detection can be enhanced by increasing the number of base stations that can be used for terminal position detection. For this purpose, in the wireless communication system using the base stations of Embodiments 1 to 4 (FIGS. 1, 5, 6, and 7) of the present invention, the base stations may be deployed such that the uplink cover range of each base station is more than double its downlink cover range and four or more base stations receive a signal from a terminal to locate.

Figure 8:
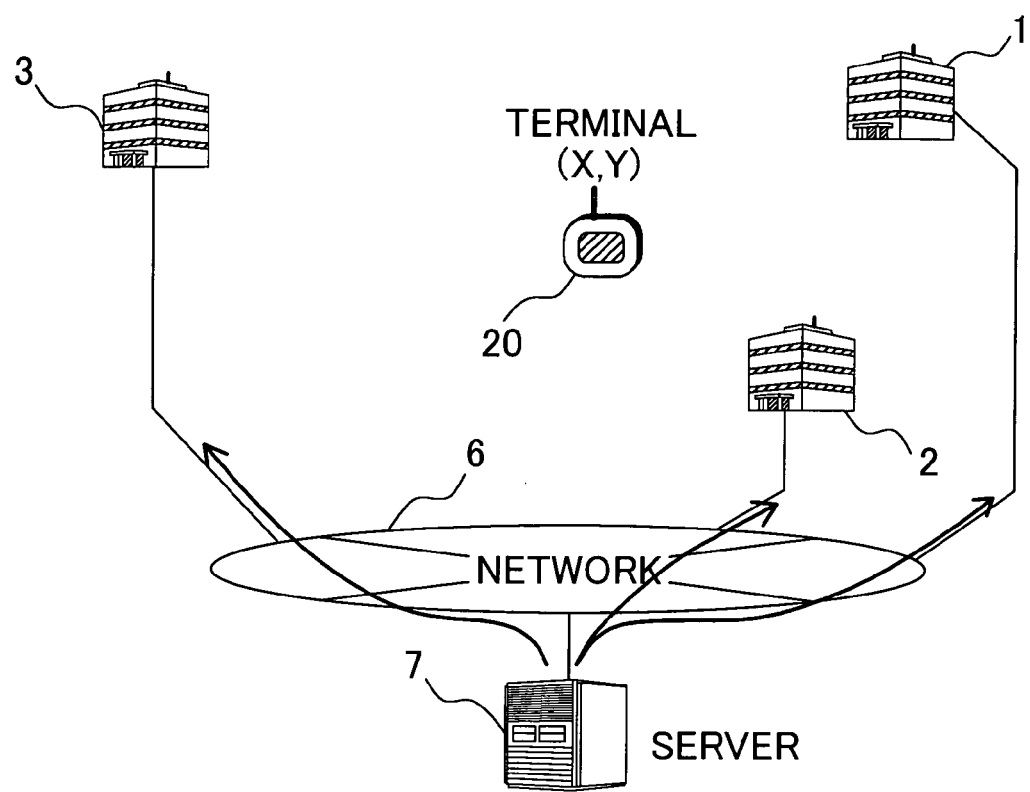
FIG. 8 is a schematic diagram of the wireless communication system using the base stations of Embodiments of the present invention to implement terminal position detection.

FIG. 8 is a schematic diagram of the wireless communication system using the base stations of Embodiments 1 to 4 to implement terminal position detection.

A plurality of base stations (by way of example, three base stations 1, 2, 3 are shown in FIG. 8) are connected to a server 7 via a network 6 that may be a public network or a mobile communication network. A terminal 20 performs information and signal exchange with the server 7 via these base stations. Under the direction of the server 7, the base stations 1 to 3 change the antenna gain and request the terminal to change the communication data rate.

The base stations 1 to 3 measure the time differences of arrival of a signal transmitted from the terminal and the server 7 collects the time differences information from the base stations and calculates the position of the terminal.

By using the base stations of Embodiments of the present invention in the system of FIG. 8, detecting the position of the terminal 20 throughout the cover areas of the base stations can be performed without increasing the number of base stations, compared with the number of base stations required for communication.

Alternatively, for a case where there is no need for terminal position detection in some areas or a case where terminal position detection is performed by a different method such as, for example GPS, it is possible to deploy base stations of conventional configuration in areas where terminal position detection is not needed and deploy the base stations of the present invention in areas where terminal position detection is needed.

As described hereinbefore, in the method for detecting a terminal position, based on time difference of arrival of an uplink signal transmitted by the terminal and received by base stations, the uplink signal transmitted by the terminal must be received by three base stations. On the other hand, it is sufficient for communication in a wireless communication system that one base station receives an uplink signal transmitted by a terminal. Therefore, on the assumption that base stations of conventional configuration are used and the conventional communication data rate setup method is used, base stations thee times as many as the number of base stations required for communication are needed to carry out terminal position detection. However, by applying the present invention, terminal position detection can be performed with base stations as many as the number of base stations required for communication. Accordingly, the number of base stations required to implement terminal position detection can be decreased by a factor of one third, compared with the prior art for terminal position detection.

The present invention can be applied to a wireless communication system in which the position of a mobile terminal is detected by using an uplink radio signal transmitted by the terminal. Especially, the invention is suitable for being applied to a wireless LAN system and mobile cellular system (particularly, a CDMA system).

What is claimed is:

1. A base station which serves for terminal position detection using radio signals, comprising:
   an antenna to transmit and receive a radio signal;
   a radio signal receiver which generates a received signal from said radio signal received;
   a signal processing unit which processes said received signal and generates a transmit signal;
   a radio signal transmitter which generates a radio signal from said transmit signal;
   a control unit which exerts control of the base station operation; and
   a signal processing unit for position detection which performs signal processing for terminal position detection,
   wherein a signal receivable range with which a signal can be received by said radio signal receiver is made longer than a signal transmission range with which a signal is transmitted by said radio signal transmitter.

2. The base station according to claim 1, wherein the receiving gain of said antenna is higher than the transmitting gain thereof so as to make said signal receivable range longer than said signal transmission range.

3. The base station according to claim 1, further comprising a transmission power control unit which reduces radio signal transmitting power and an isolator to separate radio signals to transmit and received radio signals so as to make said signal receivable range longer than said signal transmission range.

4. The base station according to claim 3, wherein said transmission power control unit comprises an attenuator which attenuates a radio signal to be transmitted.

5. The base station according to claim 1, further comprising a communication data rate control unit which controls the communication data rate of radio signals to be received,
   wherein said communication data rate control unit sets a radio signal to be transmitted from a terminal at a low communication data rate, if the radio signal is used for terminal position detection, so as to make said signal receivable range longer than said signal transmission range.

6. The base station according to claim 5, wherein said communication data rate control unit reduces the communication data rate of a signal that is used for said terminal position detection to a lowest rate that the base station supports, so as to make said signal receivable range longer than said signal transmission range.

7. A wireless communication system where base stations receive a radio signal that is transmitted by a terminal in a process for detecting the position of said terminal,
   at least one of said base stations comprising an antenna to transmit and receive a radio signal; a radio signal receiver which generates a received signal from said radio signal received; a signal processing unit which processes said received signal and generates a transmit signal; a radio signal transmitter which generates a radio signal from said transmit signal; a control unit which exerts control of the base station operation; and a signal processing unit for position detection which performs signal processing for terminal position detection, wherein a signal receivable range with which a signal can be received by said radio signal receiver is made longer than a signal transmission range with which a signal is transmitted by said radio signal transmitter.

8. The wireless communication system according to claim 7, wherein the receiving gain of said antenna is higher than the transmitting gain thereof so as to make said signal receivable range longer than said signal transmission range.

9. The wireless communication system according to claim 8, comprising a server which exerts control over terminal position detection,
   wherein, under the direction of said server, each of said base stations controls said antenna to make its receiving gain higher than its transmitting gain.

10. The wireless communication system according to claim 7,
   wherein at least either each of said base stations or said terminal comprises a communication data rate control unit which controls the communication data rate of radio signals that each of said base stations receives,
   wherein said communication data rate control unit sets a radio signal to be transmitted from the terminal at a low communication data rate, if the radio signal is used for terminal position detection, so as to make said signal receivable range longer than said signal transmission range.

11. The wireless communication system according to claim 10, wherein said communication data rate control unit reduces the communication data rate of a signal that is used for said terminal position detection to a lowest rate that the base station supports, so as to make said signal receivable range longer than said signal transmission range.

12. The wireless communication system according to claim 10, comprising a server which exerts control over terminal position detection,
   wherein, under the direction of said server, said communication data rate control unit reduces the communication data rate of an uplink signal that is used for terminal position detection to a lowest rate that the base station supports.

* * * * *